UNITED STATES PATENT OFFICE 2,599,147

CHROMIFEROUS MONOAZO-DYESTUFFS

Willy Widmer, Bottmingen, and Jakob Brassel, Basel, Switzerland, assignors to Ciba Limited, Basel, Switzerland, a Swiss firm No Drawing. Application February 7, 1949, Serial No. 75,088. In Switzerland February 26, 1948

6 Claims. (Cl. 260—151)

According to this invention valuable new chromiferous monoazo-dyestuffs are made by treating a monoazo-dyestuff of the general formula

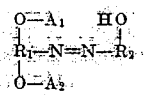

in which $R_1$ represents an aromatic radical of the benzene series free from sulfur, in which the substitutents $-N=N-$, $-O-A_1$ and $-O-A_2$ are in the 1-, 2- and 5-positions, respectively, $A_1$ and $A_2$ each represent an alkyl group, and $R_2$ represents a naphthalene radical which contains one or two sulfonic acid groups and is bound to the azo linkage in ortho-position to the hydroxyl group, with an agent yielding chromium under conditions such that the radical $A_1$ is split off.

The monoazo-dyestuffs of the above formula serving as starting materials can be made by coupling a diazo-compound of an amine of the general formula

in which $R_1$ represents an aromatic radical of the benzene series free from sulfur, in which the substitutents $-NH_2$, $-O-A_1$ and $-O-A_2$ are in the 1-, 2- and 5-positions, respectively, and $A_1$ and $A_2$ each represent an alkyl group, with a hydroxynaphthalene mono- or di-sulfonic acid capable of coupling in ortho-position to the hydroxyl group.

Since in 2-hydroxynaphthalenes coupling takes place always in the 1-position, but never in the 3-position, the expression "ortho position" used with regard to a naphthalene radical is understood to mean the position 1:2 (or 3:4, 5:6, 7:8) only, but not the position 2:3 (or 6:7).

In the amines of the above formula serving as diazo-components the radical $R_1$ may be free from further substituents or may contain further substituents, which must be free from sulfur. As such substituents there come into consideration, for example, nitro, acylamino and alkyl groups or halogen atoms such as fluorine or bromine and especially chlorine.

The two alkyl groups $A_1$ and $A_2$ may be identical or different from one another. The term "alkyl group" includes, besides straight chain aliphatic hydrocarbon residues, branched aliphatic hydrocarbon residues and cycloalkyl groups, which may be free from substituents or may contain substituents. Generally speaking, especially good results are obtained with those amines of the above formula which contain only a few, for example, 1 to 4, carbon atoms in the alkyl groups $A_1$ and $A_2$.

As examples of such amines there may be mentioned: 1 - amino - 2:5 - dimethoxybenzene, 1 - amino - 2:5 - dimethoxy - 4 - chlorobenzene, 1 - amino - 2:5 - dimethoxy - 4 - nitrobenzene, 1 - amino - 2:5 - dimethoxy - 4 - methylbenzene, 1 - amino-2:5-dimethoxy - 4 - benzoylaminobenzene, 1 - amino - 2 - methoxy - 5 - ethoxybenzene, 1-amino-2-methoxy-5-allyloxybenzene, 1-amino-2:5 - diethoxybenzene, 1 - amino - 2 - methoxy-5-butoxybenzene, 1-amino-2:5-diethoxy-4-nitrobenzene, 1-amino-2:5-diethoxy-4-chlorobenzene. As coupling components there come into consideration, for example, the following hydroxynaphthalene sulfonic acids: 1-hydroxynaphthalene-3- or -4- or 5-sulfonic acid, 1-hydroxynaphthalene-3:6- or 3:8- or 4:8-disulfonic acid, 2-hydroxynaphthalene-4- or -5- or -6- or -7- or -8-sulfonic acid, 2-hydroxynaphthalene-3:6-disulfonic acid; and also hydroxynaphthalene sulfonic acids containing further substituents such, for example, as 1-hydroxynapthalene-8-sulfonic acid-3-sulfonamide, 1-hydroxynapthalene-8-sulfonic acid-3-sulfon-n-butylamide, 1-hydroxynaphthalene-8-sulfonic acid-3-sulfon-N-methylanilide.

The diazotisation of the amines of the above formula may be carried out by a customary method in itself known, for example, with the aid of sodium nitrite and hydrochloric acid. The coupling of the diazo-compounds with the hydroxynaphthalene mono- or disulfonic acids is advantageously conducted in an alkaline medium, for example, one rendered alkaline with sodium carbonate. If desired, the coupling may be conducted in the presence of a suitable solvent, such as alcohol or pyridine.

Among the monoazo-dyestuffs of the above general formula valuable chromiferous dyestuffs are obtained with those which contain in the radical

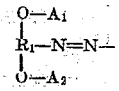

in para-position to the $-N=N-$ group one of the substituents mentioned above, advantageously a chlorine atom. For example, monoazo-dyestuffs of the formula

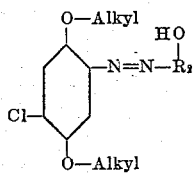

in which the alkyl groups A₁ and A₂ may be, for example, ethyl or advantageously methyl groups.

With regard to the radical R₂, those dyestuffs are e. g. of special value in which that radical is a naphthalene radical containing the hydroxyl group in the 1-position and is therefore bound to the azo-linkage in the 2-position; especially valuable chromiferous compounds being obtained with those dyestuffs which contain two sulfonic acid groups in the naphthalene radical, for example, those of the formula

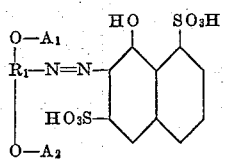

or more especially those of the formula

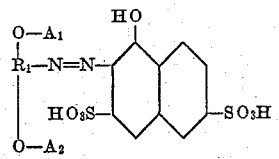

The monoazo-dyestuffs used as starting materials may, if desired, be isolated from the coupling mixture and freed from impurities. In general, however, the coupling mixture as a whole and without any intermediate separation may be used for the treatment with the agent yielding chromium. As a rule it is necessary in this case, before carrying out the reaction with the agent yielding chromium, to adjust the pH of the coupling mixture to a value favorable for the reaction, that is to say, to render it weakly acid with a mineral acid.

As agents yielding chromium there come into consideration above all salts of trivalent chromium, such as chromium fluoride, chromium sulfate, chromium acetate and chromium formate. The treatment with the agent yielding chromium is carried out under conditions such that the alkyl group A₁ is split off. This splitting off with the simultaneous formation of the complex chromium compound may be conducted by a method in itself known, by carrying out the treatment with the agent yielding chromium, for example, with chromium formate or chromium sulfate in an aqueous medium, advantageously a mineral acid medium, under pressure at a raised temperature, for example, a temperature ranging from 110° C. to 140° C.

The chromiferous dyestuffs obtainable by the invention are new. They are complex chromium compounds of monoazo dyestuffs of the general formula

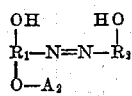

in which R₁ represents an aromatic radical of the benzene series free from sulfur, in which the substituents —N=N—, —OH and —O—A₂ are in the 1-, 2- and 5-positions respectively, A₂ represents an alkyl group, and R₂ represents a naphthalene radical which contains at least one and at the most two sulfonic acid groups and is bound to the azo linkage in ortho-position to the hydroxyl group.

These products are suitable above all for dyeing materials of animal origin, such as silk, leather and especially wool, and are also suitable for dyeing artificial fibers of superpolyamides or superpolyurethanes. The dyeings obtainable therewith are distinguished by good fastness to washing, fulling and light. Furthermore, these new products are in general distinguished from the known products of similar constitution principally in that they yield level dyeings of especially pure tints, which retain their purity when viewed in artificial light.

The following examples illustrate the invention, the parts and percentages being by weight:

*Example 1*

15.3 parts of 2:5-dimethoxy-1-aminobenzene are diazotized in the usual manner with 7 parts of sodium nitrite in the presence of 30 parts of hydrochloric acid of 30 per cent. strength. The solution is filtered, and the filtered solution of the diazo compound is run into a solution cooled to 10° C. of 23 parts of 2-hydroxynaphthalene-4-sulfonic acid and 40 parts of anhydrous sodium carbonate in 400 parts of water, while stirring well. The greater part of the dyestuff formed precipitates, and is separated by filtration. It corresponds to the formula

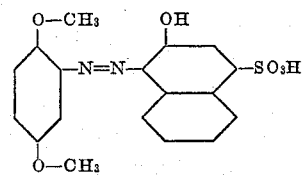

When dry, it is a dark colored substance which dissolves in dilute sodium carbonate solution with a Bordeaux red coloration and in concentrated sulfuric acid with a blue coloration, and dyes wool from an acid bath Bordeaux red tints.

This dyestuff can be converted, advantageously without preliminary drying, into its complex chromium compound. For this purpose the dyestuff paste obtained as described above is stirred with 1000 parts of hot water and sufficient sulfuric acid of 10 per cent. strength to produce a weakly mineral acid reaction. After the addition of a quantity of chromium sulfate [Cr₂(SO₄)₃] containing 5.7 parts of Cr, the reaction mixture is heated in a lead-lined autoclave fitted with stirring mechanism at 125–130° C. and stirred for 20 hours at that temperature. The greater part of the chromium compound formed precipitates. After allowing the mixture to cool to room temperature the chromium compound which is a chromium compound of the monoazo dyestuff of the formula

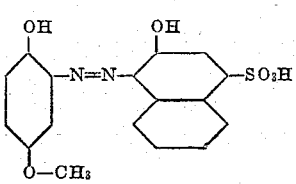

is separated by filtration and washed with sodium chloride solution of 10 per cent. strength. The filter residue is dissolved in 1000 parts of water at 55–60° C. by the addition of 20 parts of sodium hydroxide solution of 30 per cent. strength. The dyestuff solution is mixed with dilute hydrochloric acid until the reaction is neutral to litmus. The dyestuff is precipitated by the addition of sodium chloride. In the dry state it is a dark colored substance which dissolves in dilute sodium carbonate solution with a violet-blue coloration and in concentrated sulfuric acid with a green-blue coloration, and dyes wool from a sulfuric acid bath very level fast blue tints which have practically the same hue when viewed in artifical light as in daylight.

A chromiferous dyestuff having similar properties is obtained by using, instead 15.3 parts of 2:5-dimethoxy-1-aminobenzene, 18.1 parts of 2:5-diethoxy-1-aminobenzene and otherwise proceeding in the manner described above.

If 15.3 parts of 2:5-dimethoxy-1-aminobenzene are coupled with 23 parts of 2-hydroxynaphthalene-6-sulfonic acid and the so obtained monoazo-dyestuff is chromed in the manner described in the first paragraph of this example, a chromiferous dyestuff is obtained which dyes wool from a sulfuric acid bath reddish blue tints.

*Example 2*

18.8 parts of 2:5-dimethoxy-1-amino-4-chlorobenzene are diazotized in the usual manner with 7 parts of sodium nitrite in the presence of 30 parts of hydrochloric acid of 30 per cent. strength. The resulting clear solution of the diazo compound is run, while stirring well into a solution cooled to 10° C. of 31 parts of 1-hydroxynaphthalene-3:6-disulfonic acid and 30 parts of anhydrous sodium carbonate in 400 parts of water. The greater part of the dyestuff formed precipitates. It corresponds to the formula

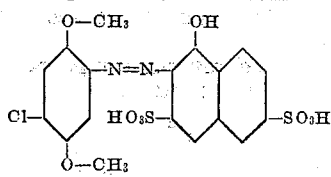

When dry it is a dark colored substance which dissolves in water and in dilute sodium carbonate solution with a ruby red coloration and in concentrated sulfuric acid with a blue coloration, and dyes wool from an acid bath bluish-red tints.

The dyestuff can be converted into its complex chromium compound without intermediate separation. For this purpose the coupling mixture obtained as described above is diluted with 200 parts of water and sufficient sulfuric acid of 10 per cent. strength to give a weakly mineral acid reaction. After the addition of a quantity of chromium sulfate $[Cr_2(SO_4)_3]$ containing 5.7 parts of Cr, the reaction mixture is heated in a lead-lined autoclave fitted with stirring mechanism at 120–125° C. and stirred for 15 hours at that temperature. The greater part of the resulting chromium compound precipitates. After allowing the whole to cool to room temperature the compound which is a chromium compound of the monoazo dyestuff of the formula

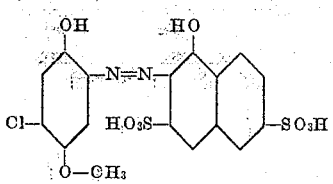

is separated by filtering and dried. In this state it is a dark colored substance which dissolves in water with a blue coloration, in diluted solutions of alkali hydroxides with a ruby red coloration, in concentrated sulfuric acid with a dirty violet coloration, and dyes wool from a sulfuric acid bath very level, fast, pure reddish blue tints which have practically the same hue when viewed in artificial light as in daylight.

A chromiferous dyestuff having similar properties is obtained by using, instead of 18.8 parts of 2:5 - dimethoxy-1-amino- 4 -chlorobenzene, 15.3 parts of 2:5-dimethoxy-1-aminobenzene and otherwise proceeding in the manner described above.

*Example 3*

15.3 parts of 2:5-dimethoxy-1-aminobenzene are diazotized in the usual manner with 7 parts of sodium nitrite in the presence of 47 parts of sulfuric acid of 38 per cent. strength. The solution is filtered, and the filtered solution of the diazo compound is run into a solution cooled to 10° C. of 31 parts of 1-hydroxynaphthalene-3:8-disulfonic acid and 40 parts of anhydrous sodium carbonate in 400 parts of water, while stirring well. The greater part of the dyestuff formed which corresponds to the formula

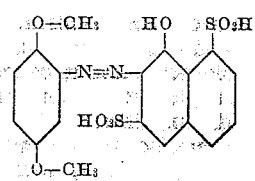

precipitates and is separated by filtration after the addition of sodium chloride. When dry, it is a dark red substance which dissolves in dilute sodium carbonate solution with a red coloration and in concentrated sulfuric acid with a blue coloration and dyes wool from an acid bath red tints.

The dyestuff can be converted advantageously without preliminary drying, into its complex chromium compound. For this purpose the dyestuff paste obtained as described above is stirred with 1000 parts of hot water and sufficient sulfuric acid of 10 per cent. strength to give a weakly mineral acid reaction. After the addition of a quantity of basic chromium sulfate $(Cr.OH.SO_4)$ containing 5.7 parts of Cr, the reaction mixture is heated at 115–125° C. in a lead-lined autoclave fitted with stirring mechanism, and stirred for 15 hours at that temperature. The greater part of the chromium compound formed precipitates. The precipitation can be completed by the addition of sodium chloride. The dyestuff which is a chromium compound of the monoazo-dyestuff of the formula

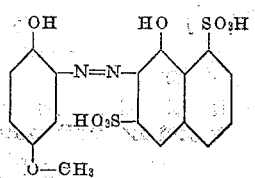

is separated by filtration after cooling the mixture to room temperature. In the dry state it is a dark colored powder which dissolves in dilute sodium carbonate solution with a red-blue coloration and in concentrated sulfuric acid with a violet-red coloration, and dyes wool from a sulfuric acid bath very level, fast, blue tints which have practically the same hue when viewed in artificial light as in daylight.

A chromiferous dyestuff having similar properties is obtained by using, instead of 15.3 parts of 2:5-dimethoxy-1-aminobenzene, 18.8 parts of 2:5-dimethoxy-4-chloro-1-aminobenzene and otherwise proceeding in the manner described above.

Example 4

19.8 parts of 2:5-dimethoxy-4-nitro-1-aminobenzene are diazotized in the usual manner with 7 parts of sodium nitrite in the presence of 115 parts of hydrochloric acid of 30 per cent. strength. The solution is filtered, and the filtered solution of the diazo compound is run, while stirring well into a solution cooled to 10° C. of 23 parts of 2-hydroxynaphthalene-4-sulfonic acid and 100 parts of anhydrous sodium carbonate in 800 parts of water. The greater part of the dyestuff formed precipitates and is separated by filtration. It corresponds to the formula

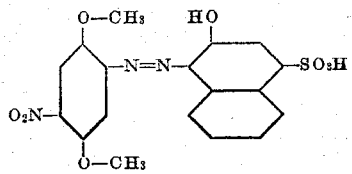

When dry it is a dark red substance which dissolves in dilute sodium carbonate solution with a Bordeaux red coloration and in concentrated sulfuric acid with a blue coloration, and dyes wool from an acid bath red tints.

The dyestuff can be converted, advantageously without preliminary drying, into its complex chromium compound. For this purpose the dyestuff paste obtained as described above is stirred with 1000 parts of hot water and sufficient sulfuric acid of 10 per cent. strength to produce a weakly mineral acid reaction. After the addition of a quantity of chromium sulfate [Cr$_2$(SO$_4$)$_3$] containing 5.7 parts of Cr, the reaction mixture is heated at 120–125° C. in a lead-lined autoclave fitted with stirring mechanism and stirred for 20 hours at that temperature. The greater part of the chromium compound formed precipitates. It is separated by filtering while hot, and washed with hot water until the initially yellow filtrate has a pure bluish tint. The filter residue is heated at 60° C. with 200 parts of hot water and 15 parts of sodium hydroxide solution of 30 per cent. strength, whereby the chromiferous dyestuff dissolves. The dyestuff solution is filtered and the complex chromium compound which is a complex chromium compound of the monoazo-dyestuff of the formula

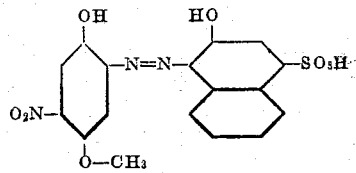

may be separated therefrom by the addition of sodium chloride and neutralisation with dilute hydrochloric acid. In the dry state the dyestuff is a dark colored substance which dissolves in dilute sodium carbonate solution with a dull violet-blue coloration and in concentrated sulfuric acid with a grey-blue coloration, and dyes wool from a sulfuric acid bath very level fast grey-blue tints.

A chromiferous dyestuff having similar dyeing properties is obtained by using instead of the 2-hydroxynaphthalene-4-sulfonic acid, the same quantity of 2-hydroxynaphthalene-6-sulfonic acid, carrying out the chroming operation in the autoclave for 25 hours at 125–130° C. and otherwise proceeding in the manner described above. The dyestuff so obtained is a dark powder which dissolves in dilute sodium carbonate solution with a blue coloration and in concentrated sulfuric acid with a Bordeaux red coloration and dyes wool from a sulfuric acid bath very level fast grey-blue tints.

Example 5

100 parts of well wetted wool are entered at 40° C. into a dyebath which contains 2 parts of the chromiferous dyestuff obtainable as described in the first and second paragraphs of Example 2, 40 parts of sulfuric acid of 10 per cent. strength and 3000 parts of water. The bath is slowly heated to the boil. After boiling for ¼ hour a further 40 parts of sulfuric acid of 10 per cent. strength are added and dyeing is carried on for 1½ hours at the boil. The wool is then rinsed in cold water and dried. It is dyed a pure blue tint.

Having thus described the invention, what is claimed is:

1. A complex chromium compound of a monoazo-dyestuff of the formula

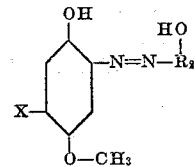

in which R$_2$ represents a naphthalene radical which contains at least one and at most two sulfonic acid groups and which is bound to the azo-linkage in ortho-position to the hydroxyl group and X represents a member selected from the group consisting of a hydrogen atom and a halogen atom.

2. A complex chromium compound of a monoazo-dyestuff of the formula

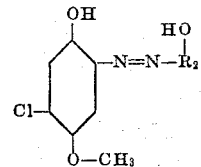

in which R$_2$ represents a naphthalene radical which contains at least one and at the most two sulfonic acid groups and which is bound to the azo-group in ortho-position to the hydroxyl group.

3. A complex chromium compound of a monoazo-dyestuff of the formula

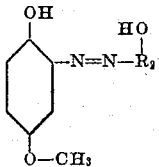

in which R$_2$ represents a naphthalene radical which contains at least one and at most two sulfonic acid groups and which is bound to the azo-group in ortho-position to the hydroxyl group.

4. A complex chromium compound of the monoazo-dyestuff of the formula

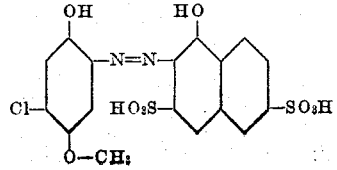

5. A complex chromium compound of the monoazo-dyestuff of the formula

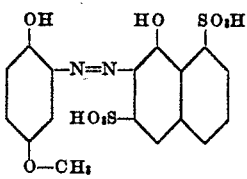

6. A complex chromium compound of the monoazo-dyestuff of the formula

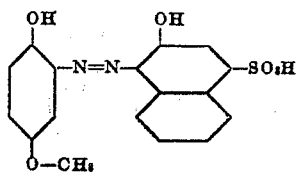

WILLY WIDMER.
JAKOB BRASSEL.

REFERENCES CITED

The following references are of record in the file of this patent:

UNITED STATES PATENTS

| Number | Name | Date |
| --- | --- | --- |
| 1,011,770 | Geldermann | Dec. 12, 1911 |
| 1,038,884 | Herzberg et al. | Sept. 17, 1912 |
| 2,353,675 | Knecht | July 18, 1944 |
| 2,400,092 | Anderson | May 14, 1946 |
| 2,452,171 | Straub et al. | Oct. 26, 1948 |

FOREIGN PATENTS

| Number | Country | Date |
| --- | --- | --- |
| 270,540 | Switzerland | Dec. 1, 1950 |